(No Model.)

N. ARCHIBALD.
FIRE LIGHTER AND KINDLER.

No. 311,462. Patented Feb. 3, 1885.

Witnesses:
E. F. Murdock
D. M. Oliver

Inventor:
Nelson Archibald
by H. A. Snow
Atty.

UNITED STATES PATENT OFFICE.

NELSON ARCHIBALD, OF SANTA MARIA, CALIFORNIA.

FIRE LIGHTER AND KINDLER.

SPECIFICATION forming part of Letters Patent No. 311,462, dated February 3, 1885.

Application filed June 24, 1884. (No model.)

*To all whom it may concern:*

Be it known that I, NELSON ARCHIBALD, of Santa Maria, county of Santa Barbara, and State of California, have invented a new and useful Improvement in Fire Kindlings or Lighters; and I do hereby declare that the following is a full, clear, and exact description of the invention, which will enable others skilled in the art to which it appertains to make and use it, reference being had to the accompanying drawings, forming a part thereof.

My invention relates to fire kindlers or lighters in which a porous non-inflammable substance is held by means of a handle that allows of expansion of the said substance; and the objects of my invention are to provide an indestructible kindling-block, and to hold said block firmly and without fear of breakage. I attain these objects by the means illustrated in the accompanying drawings, in which—

Figure 1:
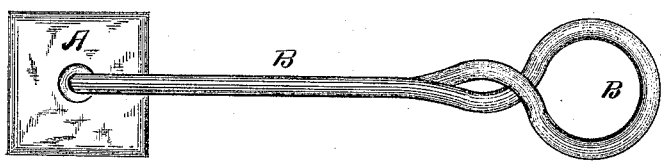
Figure 2:
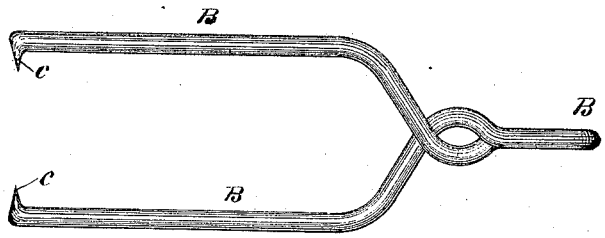

Figure 1 is a plan view of my invention, showing depressions in block to receive pivot-points of handle. Fig. 2 is a detail view of handle.

A is a porous non-combustible block, of chalk or chalky substance, held by means of the handle B, as shown in drawings. The handle B is constructed of wire in such a way as to form a spring at one end. At the other the wire is bent and pointed, and inserted in the depressions made for that purpose in the chalk A, and thus holds it firmly, but allows for the expansion of said chalk when the material with which it is saturated is lighted.

The use of my invention is as follows: The chalk is placed between the points C C, and so held by means of the spring in handle, which also forms a hand-hold, and then is placed in oil, or any inflammable substance, and allowed to soak, after which it is taken out and ignited, and with it the fire is kindled. It is obvious that after having become saturated it need not be used immediately, but can be allowed to stand until desired for use.

Having thus fully described my invention, what I claim, and desire to secure by Letters Patent of the United States, is—

1. As an article of manufacture, a non-combustible substance, A, saturated in oil or other inflammable material, and held by means of pivotal bearings C, that are kept in place by means of the spring-handle B, substantially as and for the purpose set forth and described.

2. As an article of manufacture, a handle being made of one continuous piece, forming at one extremity a spring, and the ends of said piece being bent and pointed, substantially as and for the purpose set forth and described.

In testimony that I claim the foregoing I append my signature.

NELSON ARCHIBALD.

Witnesses:
S. KAISER,
G. L. CHEADLE.